United States Patent [19]
Armstrong et al.

[11] 3,884,212
[45] May 20, 1975

[54] WIRE SAW

[75] Inventors: Leonard O. Armstrong; Donald D. Fish, both of Bedford, Ind.

[73] Assignee: W. F. Meyers Company, Inc., Bedford, Ind.

[22] Filed: Nov. 1, 1973

[21] Appl. No.: 411,644

[52] U.S. Cl. .................................................. 125/21
[51] Int. Cl. .............................................. B28d 1/08
[58] Field of Search ........................... 125/18, 21, 22

[56] References Cited
UNITED STATES PATENTS
3,598,101   8/1971   Hensley ................................ 125/21
FOREIGN PATENTS OR APPLICATIONS
1,203,000   7/1959   France ................................. 125/21
573,635   2/1958   Italy ..................................... 125/21

*Primary Examiner*—Harold D. Whitehead
*Attorney, Agent, or Firm*—Cooper, Dunham, Clark, Griffin & Moran

[57] ABSTRACT

A wire saw for cutting marble, stone, granite and the like which has abrasive cutting elements sleeved over an endless flexible wire, each of said abrasive cutting sleeves being spaced at intervals along the length thereof and having on one end face at least one formed key, a pressure molded-in-place resilient material surrounding said cable and spacing such abrasive cutting sleeves from the cable, the pressure molded-in-place resilient material also engaging the keys formed on the end face of each of said abrasive cutting sleeves to prevent rotation about the flexible wire cable, and said pressure molded-in-place resilient material providing a substantially uniform diameter for said endless saw at it moves across the usual spacedapart sheaves which are provided with grooves to accommodate the same, the abrasive cutting sleeves and the resilient spacing material being adapted in use to wear away substantially at the same rate so as to maintain a substantially constant uniform diameter for the wire saw.

2 Claims, 6 Drawing Figures

PATENTED MAY 20 1975 3,884,212

WIRE SAW

This invention relates to improvements in wire saws of the type used for sawing of marble, granite, other hard natural stones, as well as manmade materials, wherein the cutting elements are mounted on an endless wire or cable and spaced apart along the length thereof.

Such endless wire saws usually comprise a continuous wire or cable adapted to be mounted on a pair of sheaves, the continuous wire or cable having spaced-apart metal sleeves containing diamond or other abrasive grit which serves as the cutting elements of the saw.

Heretofore wire saws have been provided with a continuous wire or cable having abrasive sleeves mounted thereon which were free to rotate about such wire or cable core. Also, heretofore such wire saws have been provided wherein the individual cutting elements were bonded to the wire or cable core by the application of heat. Furthermore, such wire saws have heretofore been provided wherein the ends of the continuous wire or cable core were brazed or welded, which brazing or welding gave rise to early wire failure due to the application of such heat.

It has also heretofore been proposed to provide such a continuous wire or cable saw wherein the cable is composed of a plurality of individual wires which are intertwined or interlaced to provide the joining of the ends without welding or brazing and wherein the abrasive sleeves were swedged into engagement with the endless multiple-strand flexible cable. See for instance Hensley U.S. Pat. No. 3,598,101.

It is an object of the present invention to provide a continuous wire or cable saw having metal sleeves constituting cutting elements disposed therealong, wherein such sleeves are prevented from rotation around the cable core, and wherein the cable is made endless and the sleeves are maintained in place without the application of heat which might cause wire failure. It is also an object of the invention to protect the wire or cable core from abrasion, nicking or fatigue during use and as it rotates over the sheaves.

With these and other objects in view, the present invention provides a continuous wire or cable saw having abrasive bearing sleeves thereon in spaced relation therealong, each sleeve having a formed key which prevents rotation relative to the wire or cable, - the cutting elements being bonded to the wire or cable by means of a resilient material without the application of heat, - such resilient material not only serving to position such cutting elements but also providing a cushion between the sleeve and the wire or cable and a sheath which completely protects the wire or cable from abrasion, nicking and fatigue.

For a better understanding of the invention reference will now be made to the accompanying drawings wherein.

Figure 1:
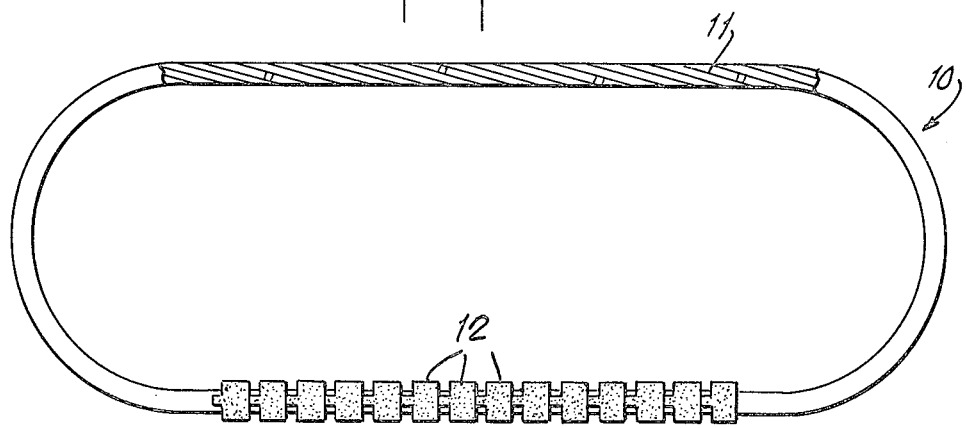
FIG. 1 is a top plan view partly in section showing the endless wire or cable core of a wire saw with the cutting elements or abrasive-bearing sleeves mounted thereon before spacing the same along such core.

Referring now to the drawings:

A continuous wire or cable 10, preferably stranded, is intertwined or interlaced as shown at 11 in cross section, to provide a continuous cable without the application of heat, welding or brazing. It has been found that heating, brazing, or welding in joining the ends of the wire or cable gives rise to weakening of the cable and results in rupture during use in the cutting of marble, granite, other natural hard stones, and man-made materials.

Figure 3:
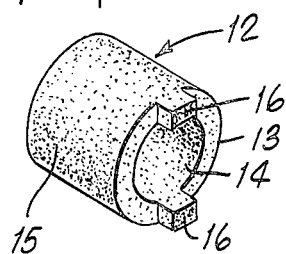
FIG. 3 is a perspective view of one sleeve cutting element showing the formed keys.

A plurality of cutting elements or abrasive-bearing sleeves 12 are mounted on the cable 10 before the end closure 11 is made. The precise structure of the cutting elements 12 is best shown in perspective in FIG. 3 from which it will be noted that the cutting elements or abrasive-bearing sleeves are hollow cylindrical in shape having an outer cylindrical surface 13 and an inner cylindrical surface 14, - such cutting elements preferably being made from powdered metal impregnated with a quantity of diamond or other abrasive grit which is generally indicated by the dotted surfaces of sleeves 12.

It will be noted from FIG. 1 that the plurality of abrasive-bearing sleeves 12 are originally applied to the endless wire or cable 10 without being separately spaced along such wire and such abrasive-bearing sleeves are applied in the number desired for the particular wire saw.

Figure 2:
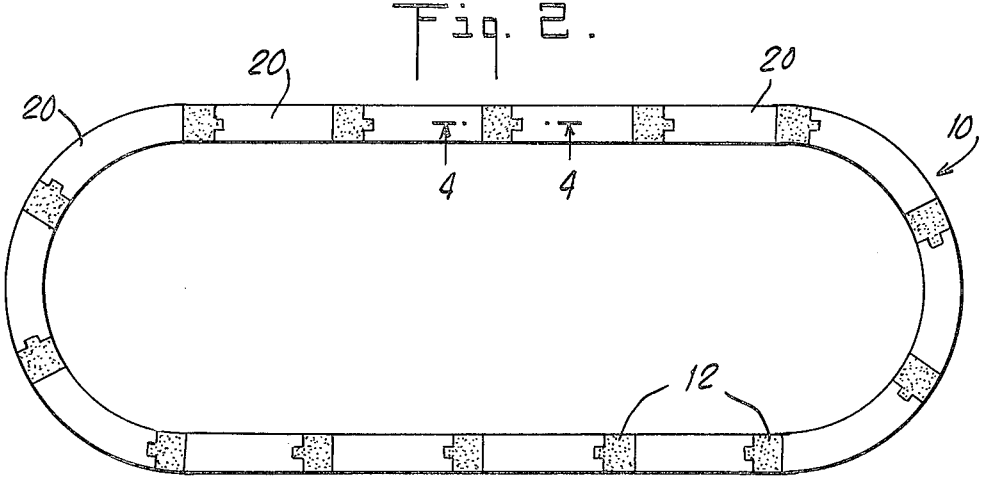
FIG. 2 is a plan view similar to FIG. 1 showing the cutting elements or abrasive-bearing sleeves suitably spaced along the wire or cable core as they are spaced in the finished wire saw with resilient material disposed between said cutting elements and surrounding the wire or cable core, the final form of wire saw shown taking the form it assumes when it is mounted over two sheaves.

In FIG. 2 it will be noted that each of abrasive-bearing sleeves 12 has been separated from the next adjacent one so as to have them more or less equally spaced along the endless cable 10. Thus in the finished form of the wire saw provided in the present invention, the abrasive-bearing sleeves 12 will be spaced from each other as shown in FIG. 2.

Referring again to FIG. 3, which shows one of the abrasive-bearing sleeves, it will be noted that it has been provided with two formed keys which are disposed diametrically opposite each other and project from one end face of the cylindrical sleeve 12. The purpose of these formed keys is to prevent rotation of the abrasive-bearing sleeve 12 around the wire or cable core 10, as will now be described.

In prior art devices it has been found that if the abrasive-bearing sleeves were permitted to rotate around the wire or cable 10 during operation of the saw it gave rise to abrasion, nicking or fatigue of the cable due to abrasive action of such sleeves on the wire or cable core. Hence an important feature of the present invention is to provide abrasive-bearing sleeves which will not rotate under working conditions around such cable core.

A second important feature of the present invention is that the entire cable core between each of the abrasive-bearing elements 12 is provided with pressure molded resilient material 20 which is pressure molded-in-place and serves to engage the keys 16 of each abrasive-bearing sleeve 12 to prevent rotation about the wire or cable core. It also provides a continuous uniform surface on the finished form of wire saw as shown in FIG. 2.

Figure 4:
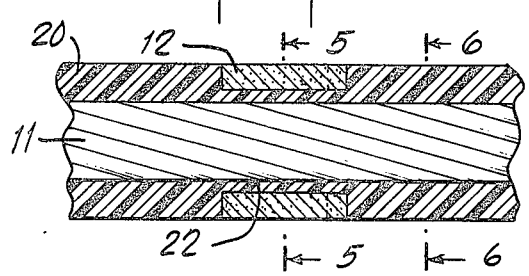
FIG. 4 is a sectional view taken along the lines 4—4 of FIG. 2, viewed in the direction of the arrows.

For a better understanding of this feature of the invention reference is made to FIG. 4 wherein a cross-section of the finished wire saw taken along the line 4—4 in FIG. 2 shows the abrasive-bearing sleeve 12 embedded in the pressure molded-in-place resilient material 20, and the stranded core 11. It will also be noted that the resilient material has a spacing layer 22 between the stranded core 11 and the abrasive-bearing sleeves 12 for a purpose which will later be explained.

In this specification when applicants use the expression "pressure molded-in-place resilient material," they have reference to any resilient material which can be pressure molded in place and maintained in place without the application of heat. Such resilient material must accomplish the purpose of locking the individual abrasive-bearing elements indirectly to the wire without heat or direct contact of such abrasive elements with the wire. It has been found that direct contact of the cutting elements with the wire or cable, or the application of any temperature in excess of 200°F. or 300°F., results in wire fatigue or metallurgical changes in the wire and that the useful life of the saw is appreciably shortened.

While applicants believe that any pressure molded-in-place resilient material may be used in the structure of the present invention as long as it meets the foregoing requirements, applicants have found that a urethane type material such as that manufactured by Devcon Corporation under the trademark "Flexane" and by Dexter Corporation under the trademark "Hysol" are most suitable. The urethane material is injected into a mold under slight pressure at room temperature while the wire 10 and the cutting elements 12 are suspended in the mold.

Figure 5:
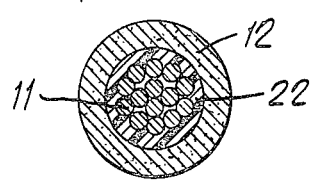
FIG. 5 is a sectional view taken along the line 5—5 of FIG. 4 and viewed in the direction of the arrows.
Figure 6:
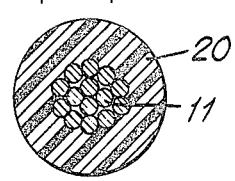
FIG. 6 is a sectional view taken along the lines 6—6 of FIG. 4 and viewed in the direction of the arrows.

Referring now to FIG. 5 which is a cross-sectional view of the wire saw of applicants' invention as taken along the lines 5—5 of FIG. 4, it will be noted that the abrasive bearing sleeve 12 is spaced from the inner stranded wire or cable 11 by the resilient spacing layer 22 which forms part of the completely encompassing sheath 20 of the pressure molded resilient material. It will also be noted from FIG. 6, which is a cross section taken along the lines 6—6 of FIG. 4 that the pressure molded resilient material 20 fully encompasses the stranded wire core 11.

It will be understood from the foregoing description that in the assembly of the abrasive bearing sleeves 12 on the wire or cable core 10 the pressure molded-in-place resilient material 20 provides a completely protective coating for the wire or cable core 10 and also spaces apart and maintains in place the abrasive bearing sleeves 12 by engaging and retaining their keys 16 so as to prevent rotation around the wire or cable core 10. It will also be understood that the resilient material as shown in FIGS. 2 and 4 forms a continuous surface with the cutting surfaces of the abrasive bearing sleeves 12 as they go around the sheaves and perform their marble, granite, hard stone or other material cutting operations. As the abrasive bearing sleeves wear away during use the resilient material 20 will also wear away so that the diameter of the saw assembly as it goes over the sheaves will remain more or less constant. Also, the relatively thin layer 22 of resilient material which separates the abrasive bearing sleeve from the wire or cable core acts as a cushion for the sleeves as they go around the sheaves and such sleeves are believed virtually to float on such resilient material. In all events, it has been found that with this construction of wire saw the cable is protected from abrasion and fatigue and is not nicked or abraded as it rotates over the sheaves.

What we claim is:

1. A saw comprising:
   a. an endless flexible wire cable,
   b. a plurality of abrasive cutting element sleeves surrounding said cable and spaced at intervals along the length thereof, each of said sleeves having on one end face a key integral therewith and extending axially therefrom, and
   c. a resilient material surrounding said cable between abrasive cutting elements and providing an uninterrupted continuous surface of substantially uniform diameter for said saw, said resilient material having a portion mating with each said axially extending key and restraining said abrasive bearing sleeves from relative rotation around said wire cable and also preventing physical contact between said sleeves and cable.

2. A saw according to claim 1, wherein the flexible wire cable is composed of a plurality of wire strands, the ends of the cable are joined by intertwining of the strands, the entire cable has a layer of a pressure molded-in-place resilient material, and said pressure molded-in-place resilient material also engages said keys.

* * * * *